Aug. 13, 1963
G. MADELUNG
3,100,611
AIRCRAFT PROPULSION SYSTEM
Filed March 17, 1961
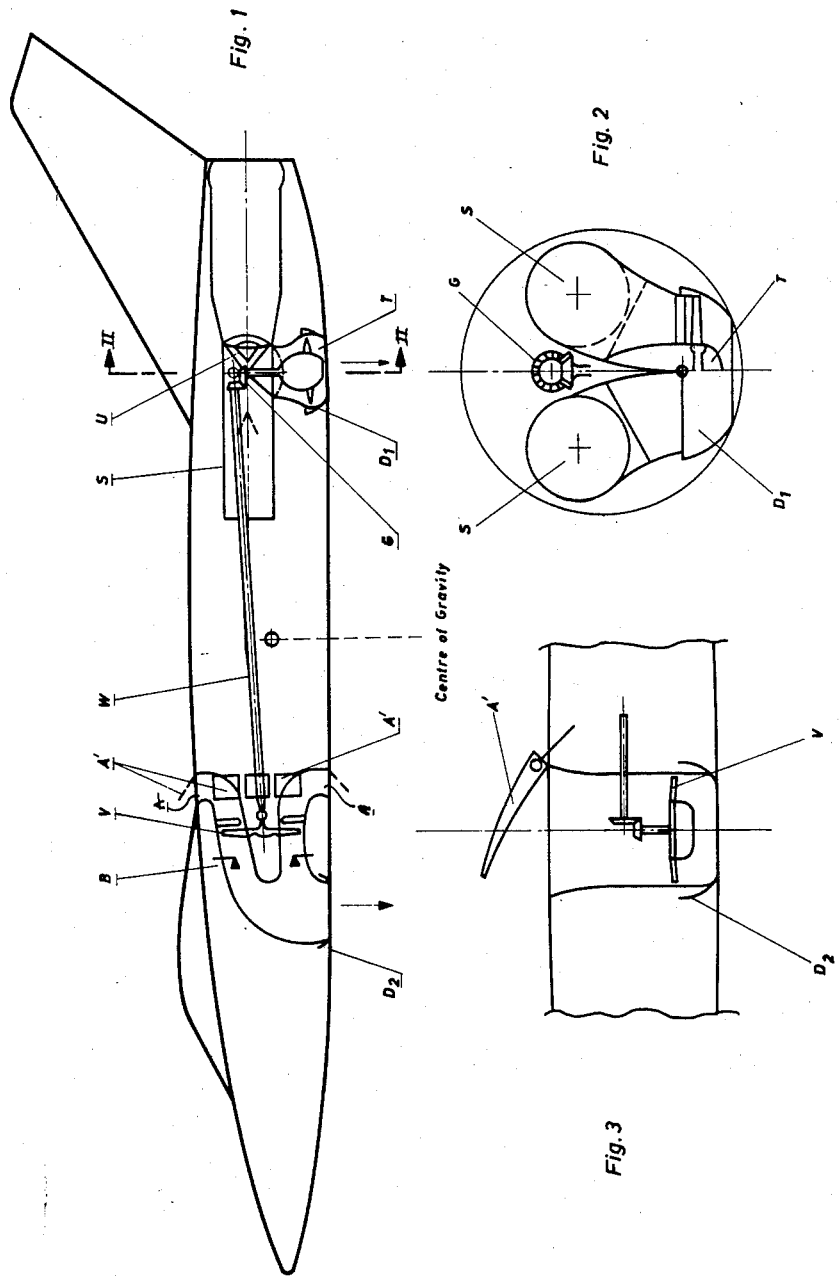
INVENTOR:
G. MADELUNG
BY: *Moore, Hall & Pollock*
ATTORNEYS.

United States Patent Office 3,100,611
Patented Aug. 13, 1963

3,100,611
AIRCRAFT PROPULSION SYSTEM
Gero Madelung, Munich, Germany, assignor to
Messerschmitt A.G., a corporation of Germany
Filed Mar. 17, 1961, Ser. No. 96,527
7 Claims. (Cl. 244—23)

The invention concerns aircraft having a jet propulsion system wherein the thrust of the engine or engines may be deflected to provide a vertical thrust at take-off or landing, but in which, during normal flight, the thrust is directed wholly rearwardly of the aircraft.

It is among the objects of the present invention to provide an aircraft having a jet propulsion system of improved type.

Another object of the present invention resides in the provision of a jet propulsion system adapted to produce either a rearwardly directed thrust or a downwardly directed thrust, the arrangement being such that component parts of said system, and downwardly directed components of said thrust, are displaced from the center of gravity of the aircraft thereby to leave said center of gravity free for receiving stationary or droppable loads.

According to the present invention an aircraft having a jet propulsion system of the type wherein a jet thrust is directed rearwardly of the aircraft for normal flight and which is adapted for a deflection of at least some of said thrust in a downward direction for take-off and landing is characterised by a main propulsion unit located adjacent the tail of the aircraft fuselage and adapted to provide said rearwardly and downwardly directed thrusts. When the system operates during a take-off or landing, to provide a downwardly deflected thrust adjacent a rear portion of the fuselage, said downwardly deflected thrust is, in addition to providing lift, applied to a turbine type motor to drive such motor; and said motor is in turn arranged to drive a lift fan disposed adjacent a forward portion of the aircraft, on the opposite side of the center of gravity of the aircraft from said motor. By this arrangement the main jet propulsion unit can be located adjacent the tail of the fuselage to provide a desired rearward thrust for normal flight operations, and said unit is nevertheless adapted to provide a downward thrust for take-off and landing. When the main unit does so provide a downward thrust, it simultaneously initiates operation of a lift fan disposed, in balanced relation to said jet propulsion unit, adjacent a forward portion of the aircraft. The downward thrust, when it occurs, thus occurs on opposite sides of the aircraft center of gravity; and the downward thrust component forward of the center of gravity is automatically initiated by commencement of the downward thrust to the rear of the center of gravity, while said downward thrust component forward of the center of gravity is likewise automatically terminated upon termination of the downward thrust component to the rear of the center of gravity.

In a preferred embodiment heater means for raising the temperature of the air leaving the lift fan are provided thereby increasing the upthrust obtained forward of the aircraft center of gravity.

The invention will now be described further, by way of example only, with reference to the accompanying drawings illustrating, diagrammatically, one embodiment thereof, and in which:

FIG. 1 is a side elevation of one embodiment of the present invention;

FIG. 2 is a section on line II—II of FIG. 1;

FIG. 3 shows a modified embodiment of the invention.

Referring now to FIGS. 1 and 2 of the drawings, an aircraft has, at the rear end of the fuselage thereof, and disposed symmetrically about its longitudinal axis, two jet engines S, arranged to provide a rearwardly directed thrust for normal flight operations. The engines S are also provided with deflectors U whereby some or all of the thrust may, when required be directed downwardly thus to apply vertical lift to the aircraft at take-off or landing. As will be appreciated from an examination of FIGURE 1, the vertical lift so provided by engines S is displaced from the indicated center of gravity of the aircraft, to the rear of said center of gravity. In accordance with a particular feature of the present invention, the downwardly directed thrust so provided adjacent the rear of the fuselage, initiates operation of a further propulsive unit providing a further downwardly directed thrust component adjacent a forward portion of the fuselage.

Thus, as shown in FIGURE 1, in the path of the deflected jet is disposed a gas turbine T, such turbine being driven by the thrust of the engines S. The further downward thrust component, initiated by the downwardly deflected jet of engines S, is provided by a lift fan V disposed well forwardly of the centre of gravity of the aircraft. Lift fan V is rotatable about a horizontally disposed axis defined by a shaft W located within the fuselage and upon which the fan V is mounted; and said shaft W is operatively connected, through an appropriate bevel gear G, to the gas turbine T. Thus the shaft W is rotatably driven by the turbine. Air is supplied to the lift fan V through slots or the like in the periphery of the fuselage and such slots, indicated at A, are provided with closure flaps A' in conventional manner. The air, initially moving forwardly of the aircraft during passage from the slots A to the lift fan V is then directed downwardly. After passing the lift fan V the air is heated by burners B and the thrust is still further increased by injecting combustible fuel into the region of the burners.

The part of the thrust from the engines S which is deflected downwardly by the deflectors U passes the turbine T and leaves the fuselage through an exhaust nozzle $D_1$, preferably of a type constructed to have a certain mobility. The air jet emanating from the lift fan V, the thrust of which is preferably augmented by combustion products effected by burning fuel in the region thereof, passes through a similar exhaust nozzle $D_2$. In operation, when it is required to provide additional lift at take-off or landing, the deflectors U are caused to apply part, at least, of the air from the engines S to the turbine T, and thus the shaft W is caused to rotate. Rotation of the shaft W in turn causes the lift fan V to rotate and by introducing combustible fuel into the resulting air flow, and igniting such fuel at burner B, an upthrust is obtained at the forward part of the aircraft.

Thus, during take-off or landing operations, lift is applied on both sides of the centre of gravity of the aircraft and stability is therefore possible.

An aircraft having a jet propulsion system in accordance with the present invention will possess some or all of the following advantages.

(1) A larger lifting thrust is possible than with conventional systems;

(2) The aircraft main engines may be located at the rear end of the fuselage;

(3) The number of main engines is independent of the arrangement for attaining vertical lift;

(4) The disposition of the exhaust outlets $D_1$ and $D_2$ is independent of the centre of gravity of the aircraft in that the outlets may be spaced therefrom.

The invention is not restricted to the particular features of the embodiment hereinbefore described, since alternatives will readily present themselves to one skilled in the art. For example, whilst in the embodiment described in reference to FIG. 1, the air for the lift fan V is introduced in a substantially horizontal direction and is subsequently deflected through 90°, the invention is not restricted to such a feature since the air may pass in a vertical direction throughout the whole of its passage, the fan V being readily arranged for rotation about a vertical axis. Such an alternative form of the invention is shown in FIGURE 3.

Having thus described my invention, I claim:

1. An aircraft having a jet propulsion system mounted in the fuselage thereof, said system being of the type wherein a jet thrust is directed rearwardly of the aircraft for normal flight and wherein at least some of said thrust is adapted to be deflected in a downward direction for take-off and landing operations, said system comprising a main jet propulsion unit located adjacent the tail of the aircraft fuselage at a position disposed rearward of the aircraft center of gravity, said main jet propulsion unit being normally adapted to produce a rearward thrust for normal flight of said aircraft, means adjacent said main jet unit for deflecting at least a portion of said thrust in a downward direction thereby to provide a downwardly deflected thrust from said main jet unit operative during take-off and landing operations to provide a first lifting thrust component adjacent the rear of said fuselage at a first position disposed rearward of the aircraft center of gravity, a motor disposed rearward of said aircraft center of gravity adjacent and within the tail of said aircraft fuselage in the path of said downwardly deflected main jet unit thrust to be driven thereby, a lift fan mounted within a forward portion of said aircraft fuselage on the opposite side of the center of gravity of the aircraft from said motor, and a positive drive connection between said motor and said lift fan, the aircraft fuselage including means adapted to allow introduction of air to the region of the lift fan and the discharge of said air in a downward direction after passing through said lift fan whereby said lift fan provides a second lifting thrust component, initiated by and cooperating with said first lifting thrust component, adjacent a forward portion of said fuselage at a further position remote from the aircraft center of gravity and on the opposite side of said center of gravity from said first position.

2. An aircraft as claimed in claim 1 including heater means whereby the air may be heated after passing through the lift fan.

3. An aircraft as claimed in claim 2 in which said heater means includes a fuel injection and ignition arrangement.

4. An aircraft having a jet propulsion system mounted in the tail of the fuselage thereof, said jet propulsion system including means operative to produce a jet thrust directed rearwardly of the aircraft for normal flight and means adapted for deflection of at least some of said thrust in a downward direction to produce a downward thrust for use during take-off and landing operations, a turbine mounted rearwardly of the aircraft center of gravity within the aircraft fuselage and disposed in the path of the downwardly deflected thrust, a lift fan mounted towards the front of the aircraft fuselage and disposed within said fuselage forwardly of the centre of gravity of the aircraft, a positive drive connection between said turbine and said lift fan, said drive connection being located within said aircraft fuselage, fuel injection nozzles on the output side of the lift fan, and fuel ignition means adjacent said nozzles.

5. An aircraft jet propulsion system comprising a propulsion unit mounted adjacent the tail of the aircraft fuselage at a position remote from and to the rear of the aircraft center of gravity, said propulsion unit including means producing a jet thrust directed rearwardly of the aircraft for normal flight and means adapted to effect selective deflection of at least some of said jet thrust in a downward direction at a position rearward of the aircraft center of gravity, a turbine mounted in said aircraft fuselage rearwardly of the center of gravity of the aircraft and disposed in the path of the deflected thrust, a lift fan mounted in said aircraft fuselage and disposed for rotation forwardly of said center of gravity, a shaft within said fuselage upon which said fan is mounted for said rotation, an output shaft from said turbine within said fuselage, and gear means mechanically coupling said two shafts to one another within said fuselage whereby rotation of said turbine output shaft in response to said selective downward deflection of said propulsion unit thrust initiates and effects rotation of said lift fan whereas termination of said downward thrust deflection and resumption of said normal flight rearwardly directed thrust terminates rotation of said lift fan.

6. An aircraft as claimed in claim 5 including fuel injection and combustion means forwardly of the lift fan.

7. The system of claim 5 wherein said lift fan is disposed for rotation about a substantially horizontal axis within said fuselage, means in said fuselage for directing air in a substantially horizontal direction through said lift fan and for thereafter deflecting the air stream produced upon rotation of said lift fan through substantially 90 degrees whereby said air stream is directed downwardly, and an outlet nozzle for exhausting said deflected downwardly directed air stream from a lower portion of said fuselage at a position forward of the aircraft center of gravity.

References Cited in the file of this patent

UNITED STATES PATENTS

| 2,912,188 | Singelmann | Nov. 10, 1959 |
| 2,918,231 | Lippisch | Dec. 22, 1959 |
| 2,939,649 | Shaw | June 7, 1960 |

FOREIGN PATENTS

| 846,300 | Great Britain | Aug. 31, 1960 |
| 1,242,564 | France | Aug. 22, 1960 |